(12) United States Patent
Kawanishi et al.

(10) Patent No.: US 11,212,572 B2
(45) Date of Patent: Dec. 28, 2021

(54) CONTENT DETERMINATION DEVICE, CONTENT DETERMINATION METHOD, AND PROGRAM

(71) Applicant: NIPPON TELEGRAPH AND TELEPHONE CORPORATION, Tokyo (JP)

(72) Inventors: Takahito Kawanishi, Tokyo (JP); Hidehisa Nagano, Tokyo (JP); Kunio Kashino, Tokyo (JP); Yasunori Oishi, Tokyo (JP); Kaoru Hiramatsu, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/967,384

(22) PCT Filed: Feb. 5, 2019

(86) PCT No.: PCT/JP2019/003946
§ 371 (c)(1),
(2) Date: Aug. 4, 2020

(87) PCT Pub. No.: WO2019/156043
PCT Pub. Date: Aug. 15, 2019

(65) Prior Publication Data
US 2021/0219008 A1    Jul. 15, 2021

(30) Foreign Application Priority Data
Feb. 6, 2018 (JP) .............................. JP2018-019567

(51) Int. Cl.
*H04N 21/2668* (2011.01)
*G06K 9/62* (2006.01)
*H04N 21/2343* (2011.01)

(52) U.S. Cl.
CPC ....... *H04N 21/2668* (2013.01); *G06K 9/6215* (2013.01); *H04N 21/234345* (2013.01); *H04N 21/234381* (2013.01)

(58) Field of Classification Search
CPC ... G06K 9/6201–6215; H04N 21/2668; H04N 21/234345; H04N 21/234381; G06F 16/00; G06F 16/783
See application file for complete search history.

(56) References Cited

U.S. PATENT DOCUMENTS 8,358,854 B2 *  1/2013  Yamada ............... G06K 9/4671
                                                                382/209
2013/0060766 A1 *  3/2013  Lin ...................... G06K 9/4676
                                                                707/723
(Continued)

FOREIGN PATENT DOCUMENTS

CN           108182457 A   *  6/2018
WO     WO-0007372 A1   *  2/2000   ........... H04N 19/124
WO  WO-2004021281 A1  *  3/2004   ......... G06K 9/00771

OTHER PUBLICATIONS

Kawanishi, Takahito, et al., "Media Fingerprint Technology for Identifying Music and Video and Its Application," Industrial Materials, NII Electronic Library Service, The Japan Society for Industrial and Applied Mathematics, vol. 21, No. 4 Dec. 2011.

*Primary Examiner* — Robert J Hance

(57) ABSTRACT

An identifier of query content is accurately determined. A content determining device 100 includes an input unit 2 that inputs query content, a storage unit 1 that stores a plurality of pieces of master content, and a content determining unit 4 that determines a region where feature values of two pieces of master content out of the plurality of pieces of master content do not match each other, calculates a matching feature count which is a count of feature values of the region that match feature values in a corresponding region of the
(Continued)

query content, for each of the two pieces of master content, and determines an identifier of the query content on the basis of the matching feature count of each of the pieces of master content.

20 Claims, 17 Drawing Sheets

(56) References Cited

U.S. PATENT DOCUMENTS

2013/0085893 A1* 4/2013 Bhardwaj ........... G06F 16/5866
                                                    705/26.62
2018/0211393 A1* 7/2018 Chen .................. G06K 9/00744

* cited by examiner

CONTENT DETERMINATION DEVICE, CONTENT DETERMINATION METHOD, AND PROGRAM

CROSS-REFERENCE TO RELATED APPLICATIONS

This application is a U.S. 371 Application of International Patent Application No. PCT/JP2019/003946, filed on 5 Feb. 2019, which application claims priority to and the benefit of JP Application No. 2018-019567, filed on 6 Feb. 2018, the disclosures of which are hereby incorporated herein by reference in their entireties.

TECHNICAL FIELD

The present invention relates to a content determining device, a content determining method, and a program.

BACKGROUND ART

There conventionally has been known searching, from signals indicating audio or video stored in a database, a signal closest to a target signal. For example, NPL 1 describes quantifying target signals made up of snippets of sound or video that have been specified, and accumulated signals of sound or video accumulated in a database in time series, and calculating a similarity value, which is a degree of similarity between the quantified target signal and accumulated signals, thereby searching for an accumulated signal that is most similar to the target signal.

CITATION LIST

Non Patent Literature

[NPL 1] Takahito Kawanishi and five others, *Ongaku Ya Eizou Wo Tokutei-suru Medhia Shimonn Gijutsu To Sono Oyo* (Media Fingerprinting Technology to Identify Music and Video, and Application Thereof), The Japan Society for Industrial and Applied Mathematics, Applied Mathematics Vol. 21 (2011), p. 289-292

SUMMARY OF THE INVENTION

Technical Problem

In recent years, various kinds of different content are being provided by television broadcasts and so forth. Now, there is demand for accurately determining which of a plurality of known pieces of content stored beforehand (hereinafter referred to as "master content") that content provided by a television broadcast or the like (hereinafter referred to as "query content") is, in order to analyze the past record of the content having been provided by a television broadcast. In particular, there are cases where content of commercials having different versions, where audio or part of video in a frame differs in a predetermined frame section, is provided. There is demand to be able to accurately determine which of a plurality of pieces of known content version that the version of the content provided by the television broadcast or the like is, in this case.

However, there are cases where one or more of the plurality of pieces of master content and the query content contain noise. There are also cases where portions that are different in the pieces of maste r content as to othe r pieces of maste r content are minuscule in the entirety of content. In such cases, there may be cases where the similarity value of the master content as to the query conten t is a value that has been affected by noise, and accordingly which piece of master content that the query content is cannot be accurately determined on the basis of the similarity value.

An object of the present invention made in light of the above circumstances is to provide a content determining device, a content determining method, and a program, in which an identifier of query content can be accurately determined.

Means for Solving the Problem

In order to solve the above problem, a content determining device according to the present invention includes an input unit that inputs query content, a storage unit that stores a plurality of pieces of master content, and a content determining unit that determines a region where feature values of two pieces of master content out of the plurality of pieces of master content do not match each other, calculates a matching feature count which is a count of feature values of the region that match feature values in a corresponding region of the query content, for each of the two pieces of master content, and determines an identifier of the query content on the basis of the matching feature count of each of the pieces of master content.

Also, a content determining method according to the present invention is a content determining method that a content determining device executes, and includes a step of inputting query content, a step of storing a plurality of pieces of master content, and a step of determining a region where feature values of two pieces of master content out of the plurality of pieces of master content do not match each other, calculating a matching feature count which is a count of feature values of the region that match feature values in a corresponding region of the query content, for each of the two pieces of master content, and determining an identifier of the query content on the basis of the matching feature count of each of the pieces of master content.

Also, a program according to the present invention causes a computer to function as the above content determining device.

Effects of the Invention

According to the present invention, an identifier of query content can be accurately determined.

DESCRIPTION OF EMBODIMENTS

A first embodiment of the present invention will be described below with reference to the Figures.

Figure 1:
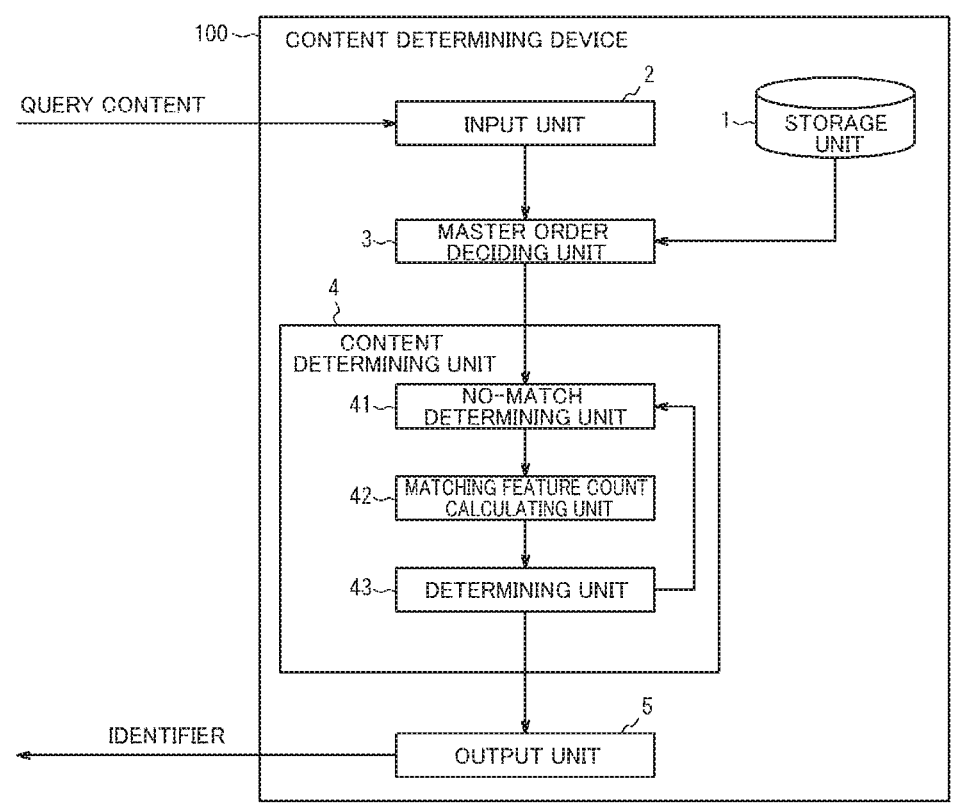
FIG. 1 is a block diagram illustrating a configuration example of a content determining device according to a first embodiment of the present invention.

FIG. 1 is a diagram illustrating a configuration example of a content determining device 100 according to the present embodiment. The content determining device 100 is provided with a storage unit 1, an input unit 2, a master order deciding unit 3, a content determining unit 4, and an output unit 5, as illustrated in FIG. 1.

The storage unit 1 stores a plurality of pieces of master content. In the following, it will be assumed that N types (where N is an integer of 2 or larger) of master content are stored in the storage unit 1. Master content is data made up of video and audio, and for example is commercial content of which the object is billing and advertising. The storage unit 1 also stores the master content in a manner correlated with an identifier that uniquely identifies the master content. For example, a plurality of pieces of master content may be content of different versions, which are made up of the same video and audio to a predetermined proportion or more, and are only partially made up of different video and audio. This is not restrictive, and the plurality of pieces of master content may be content made up of video and audio completely different from each other.

Figure 2:
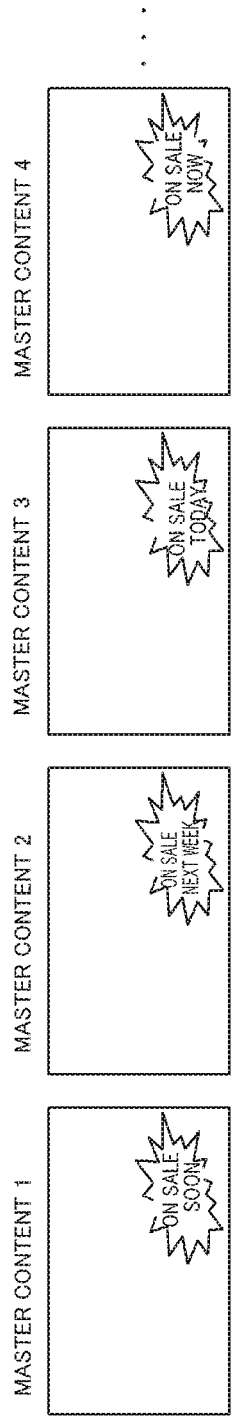
FIG. 2 is a diagram illustrating an example of a unique portion included in each of a plurality of pieces of master contest.

The N types of master content stored in the storage unit 1 are different from each other regarding at least a part of video in frames within a predetermined frame section, for example, as illustrated in FIG. 2. This different portion will be referred to as "unique portion" hereinafter. The unique portions are included in video making up the content by the creator of the content. Note that unique portions are not restricted to the example illustrated in FIG. 2, and may be audio in a predetermined frame section.

Figure 3:
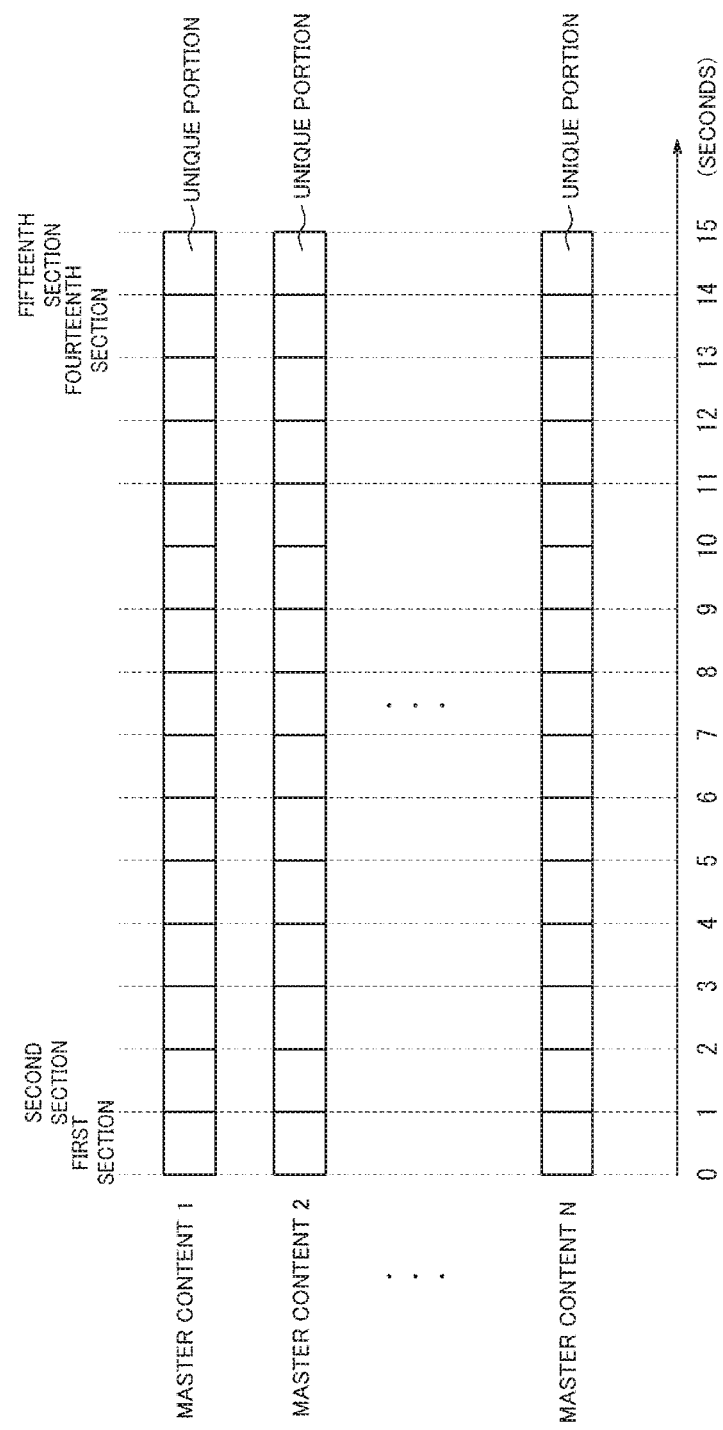
FIG. 3 is a conceptual diagram illustrating N types of master content stored ino a storage unit.

Each piece of master content is configured of a plurality of sections, as illustrated in FIG. 3. A section played from (t−1) seconds to t seconds will be referred to as a t'th section (where t is a natural number). Each piece of master content has unique portions that each differ, only in a predetermined section (the fifteenth section in the example in FIG. 3). In this case, similar values in each section other than the predetermined section (hereinafter referred to as "section similarity value") are larger than the similarity value in the predetermined section. The section similarity value is an index indicating the degree to which each section of each piece of content is similar to the section of the query content corresponding thereto. The section similarity value is calculated by, for example, the DAL (Divide And Locate Method) method, where features extracted from a spectrogram made up of a frequency axis of audio signals or video signals and a temporal axis are used. Section similarity values may be calculated using features extracted from a spectrogram made up of frequency axes of each of audio signals and video signals and a temporal axis, by the BAM (Binary Area Matching) method or the CAM (Coarsely-quantized Area Matching) method. Section similarity values are not restricted to being calculated by these, and may be calculated by any method where the degree of similarity of content made up of video or audio is calculated. In the example illustrated in FIG. 3, a unique portion is included in the fifteenth section of each piece of master content. In this case, each section similarity value from the first section to the fourteenth section is higher than the section similarity value in the fifteenth section.

Returning to FIG. 1, the input unit 2 inputs query content.

The master order deciding unit 3 decides the order of each piece of master content on the basis of the similarity value of each piece of the plurality of pieces of master content as to the query content. As one example, the master order deciding unit 3 calculates a comprehensive similarity value of each of theNtypes of master content stored in the storage unit 1 as the similarity value. The master order deciding unit 3 then decides the order of each piece of master content on the basis of the comprehensive similarity value. The comprehensive similarity value is a value indicating the comprehensive degree of similarity of the master content as to the query content, and is the smallest value of the section similarity values calculated at each of the sections in the master content.

Specifically, the master order deciding unit 3 calculates the section similarity value for each of the N types of master content. In a case where each piece of master content is configured of a first section through a fifteenth section as illustrated in FIG. 3, for example, the master order deciding unit 3 calculates the section similarity value for each of the first section through the fifteenth section for each piece of master content and the first section through the fifteenth section of the query content. The master order deciding unit 3 then calculates the smallest value of the section similarity values in each piece of master content as the comprehensive similarity value. Further, the master order deciding unit 3 decides the order of pieces of master content such that in the N types of master content, the smaller the comprehensive similarity value is, the higher the order is (the smaller the number indicating the order is).

As described above, the unique portion is contained only in the predetermined sections of the N types of master content stored in the storage unit 1. Accordingly, the section similarity value in the predetermined section in a piece of master content different from the query content will be lower than the section similarity value in the predetermined section in a piece of master content that corresponds to the query content. Also, the section similarity value in the predetermined section in a piece of master content different from the query content will be lower than section similarity values in other than the predetermined section. Thus, the smallest section similarity value out of the section similarity values of each piece of master content calculated by the master order deciding unit 3 can be considered to represent the features of that piece of master content well. In this way, in the conventional art, the master order deciding unit 3 has been calculating the lowest section similarity value of each piece of master content to be the comprehensive similarity value, and determining the piece of master content of which the comprehensive similarity value is the largest to correspond to the query content.

Figure 4:
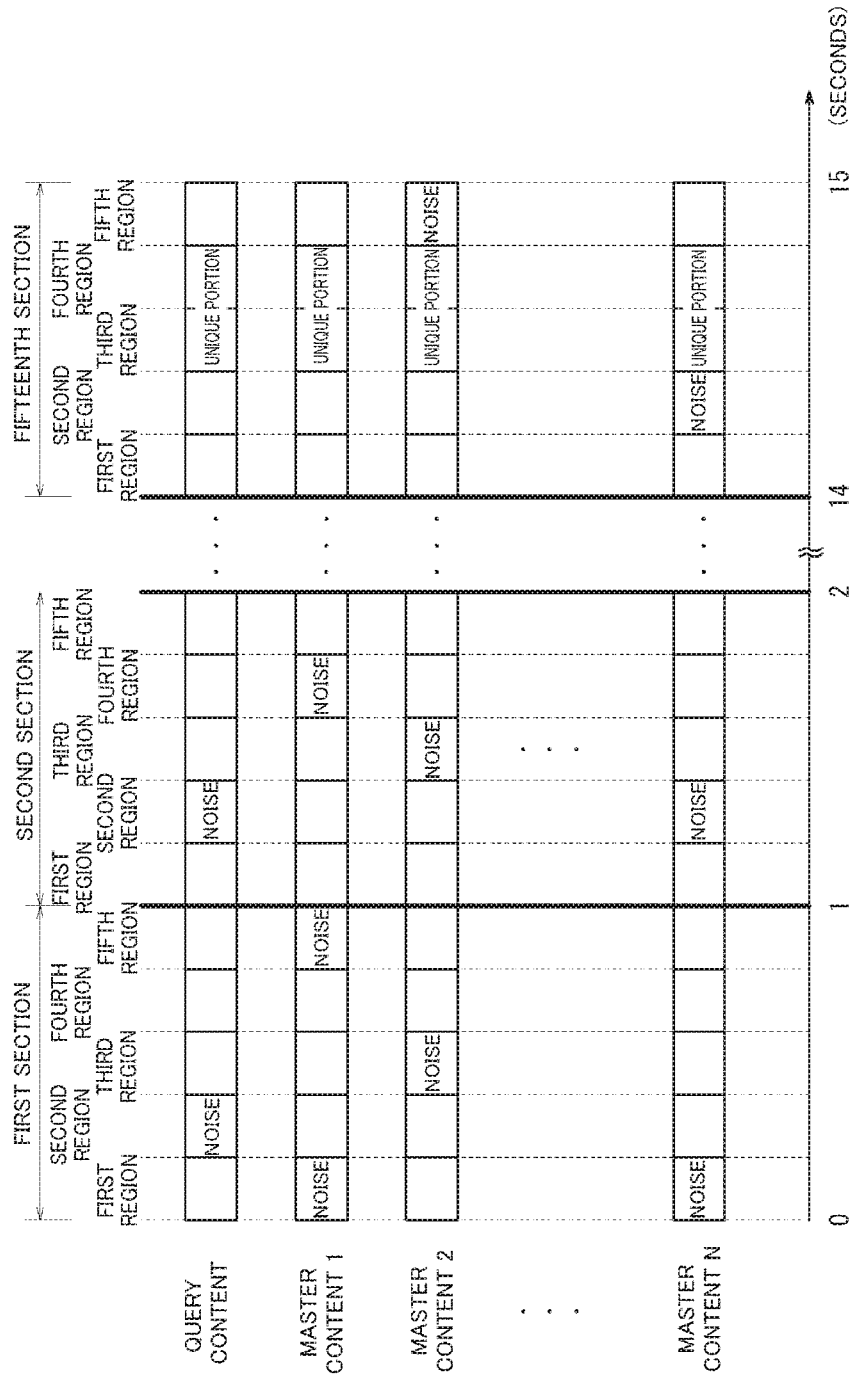
FIG. 4 is a conceptual diagram illustrating query content and master content containing noise.

However, in reality, there are cases where several regions of several sections contain noise in each piece of content, as illustrated in FIG. 4. In the BAM method and the CAM method, a region is a region corresponding to a feature value obtained by characterization of sudden change in audio signals and video signals. A feature value is, for example, a symbol, numeric value, etc., that represents a feature extracted from a spectrogram made up of a frequency axis and temporal axis. Further, there are cases where several regions of several sections contain noise in the query content as well. This noise is generated when the content is encoded by a television station before being provided by a television broadcast for example. Further, encoding formats differ among a plurality of television stations. Accordingly, even if the same content is provided by television broadcasts, there are cases where noise contained in each piece of content differs. There also are cases where the same region of the same section in different pieces of content provided by the same television station contains the same noise.

Accordingly, there are cases where, when the master order deciding unit 3 is calculating section similarity values, the section similarity values of sections not containing a unique portion in master content that corresponds to query content is calculated low due to noise. Also, the proportion of unique portions as to the entirety of the content is often minute (e.g., 5% or less). Accordingly, there are cases where a section similarity value calculated due to noise in master content corresponding to the query content is lower than a section similarity value calculated due to the unique portion in master content different from the query content. As a result, there are cases where the comprehensive similarity value of master content different from the query content is the greatest, and the master content corresponding to the query content is not correctly determined.

In order to prevent such erroneous determination, the content determining unit 4 determines an identifier of the query content, which will be described below in detail. The content determining unit 4 is provided with a no-match determining unit 41, a matching feature count calculating unit 42, and a determining unit 43.

The no-match determining unit 41 determines whether or not feature values of two pieces of master content out of N types of master content in corresponding regions of corresponding sections match.

Specifically, The no-match determining unit 41 determines a matching feature count, which is the number of feature values of pieces of master content matching feature values of the query content, in a sequence on the basis of on the order decided by the master order deciding unit 3. For example, the no-match determining unit 41 first determines a region where feature values do not match in corresponding regions of corresponding sections between the piece of master content with the highest order and the piece of master content with the next highest order. Thereafter, upon a piece of candidate master content being determined by the determining unit 43, which will be described later, the no-match determining unit 41 determines a region where feature values do not match in corresponding regions of corresponding sections in the following content. The piece of candidate master content, and the piece of master content of which the order is the highest out of the pieces of master content that are not the object of determination of regions where feature values do not match yet. The no-match determining unit 41 repeats this for the N types of master content until all become the object of determination of regions where feature values do not match.

Figure 5:
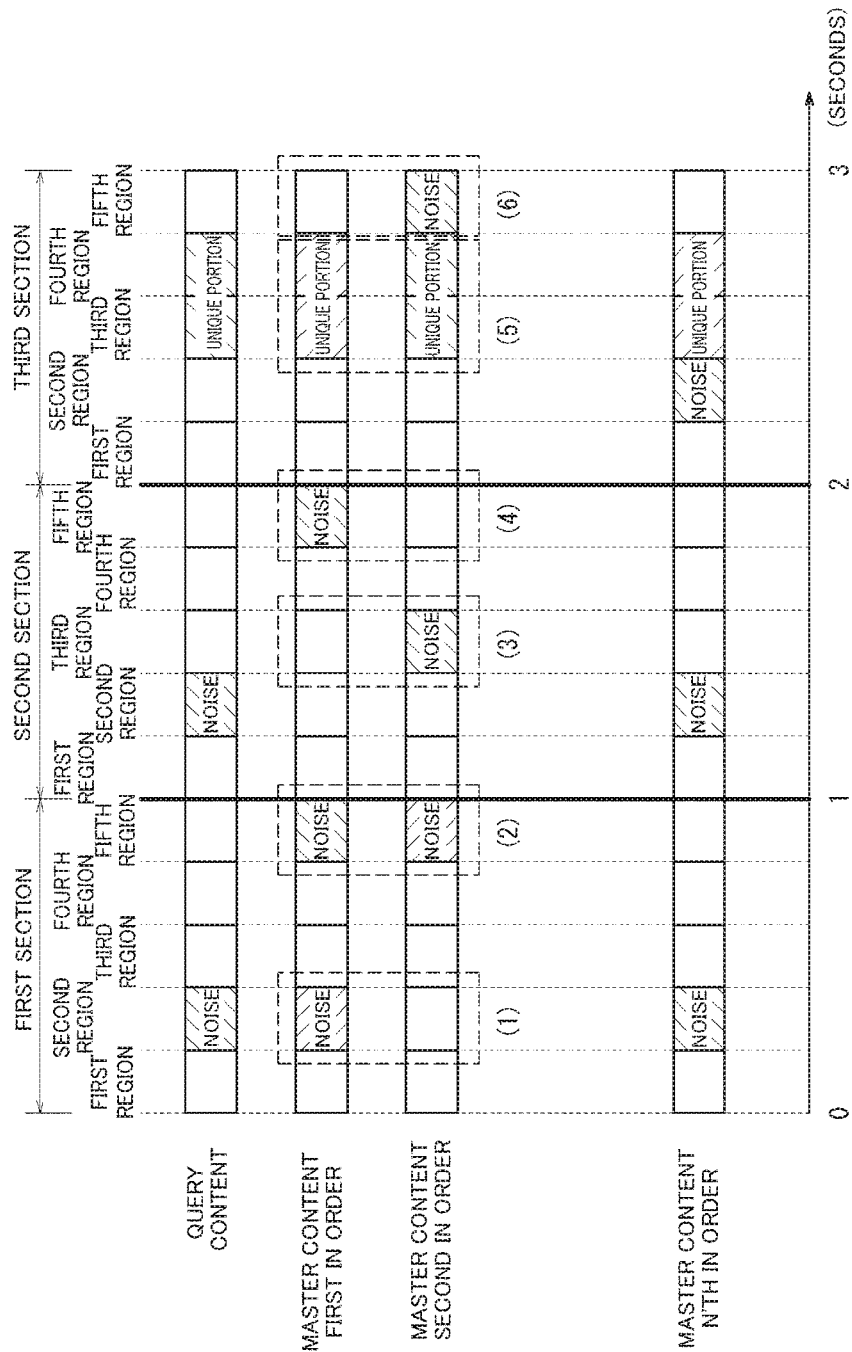
FIG. 5 is a conceptual diagram illustrating query content and master content configured of three sections.

To facilitate description in an example illustrated in FIG. 5, each piece of the master content and the query content is configured of first through third sections, and the video of each section includes first through fifth regions. The noises are each different. The unique portion that the query content contains is the same as the unique portion of the piece of master content second in order, and is contained in the third and fourth regions of the third section. Note that the unique portions that the N types of master content each contain are different, as described above. In this case, the no-match determining unit 41 first determines that the feature value in the first region of the first section of the piece of master content first in order and the piece of master content second in order match each other. The no-match determining unit 41 also determines that the feature value in the second region of the first section of the piece of master content first in order and the piece of master content second in order do not match each other (see (1) in FIG. 5). In the same way, the no-match determining unit 41 determines that the feature values in the fifth region of the first section (see (2) in FIG. 5), the third region of the second section (see (3) in FIG. 5), the fifth region of the second section. (see (4) in FIG. 5), and the third through fifth regions of the third section (see (5) and (6) in FIG. 5), do not match each other.

The matching feature count calculating unit 42 calculates the matching feature count as to the query content for each of the two pieces of master content determined by the no-match determining unit 41. The matching feature count is the number of feature values that match the feature values of the query content corresponding to these feature values, out of the feature values determined by the no-match determining unit 41 not to match.

The matching feature count calculating unit 42 first calculates, on the basis of feature values that did not match each other in the piece of master content with the highest order (first in order) and the piece of master content next highest in order (second in order), the matching feature count for each of the piece of master content the highest in order, and next the piece of master content next highest in order, as described above. In the example illustrated in FIG. 5, the matching feature count calculating unit 42 calculates the matching feature count of the above pieces of master content and the query content as follows, within a region where the feature values of the piece of master content first in order and the piece of master content second in order do not match each other. Determination is made regarding whether or not feature values of the piece of master content first in order and the piece of master content second in order each match feature values at corresponding regions of the query content, in each of the second and fifth regions of the first section, the third and fifth regions of the second section, and the third through fifth regions of the third section illustrated in FIG. 5. In this case, the matching feature count calculating unit 42 determines that the feature values of the piece of master content first in order matches the feature values of the query content in the third region of the second section and the fifth region of the third section. Thus, the matching feature count calculating unit 42 calculates the matching feature count of the piece of master content first in order to be "2". In the same way, the matching feature count calculating unit 42 determines that the feature values of the piece of master content second in order matches the feature values of the query content in the fifth region of the second section and the third and fourth regions of the third section. Thus, the matching feature count calculating unit 42 calculates the matching feature count of the piece of master content second in order to be "3".

The determining unit 43 determines, on the basis of the matching feature count calculated by the matching feature count calculating unit 42, the identifier of the query content. Specifically, the determining unit 43 determines, out of the piece of master content highest in order and the piece of master content next highest in order, the piece of master content of which the respective matching feature count is larger, to be a piece of candidate master content. The determining unit 43 then determines a region in the following content where feature values in corresponding regions of corresponding sections do not match. The above piece of candidate master content, and a piece of master content of which the order is highest out of pieces of master content regarding which determination has not been made for regions where feature values do not match each other. Further, the determining unit 43 determines the piece of master content of which the matching feature count is larger on the basis of these regions to be a new piece of candidate master content, which is repeated. The determining unit 43 then determines the identifier of the piece of candidate master content determined at the last to be the identifier of the query content.

In the example illustrated in FIG. 5, the matching feature count of the piece of master content first in order is calculated to be "2", and the matching feature count of the piece of master content second in order is calculated to be "3", so the determining unit 43 determines the piece of master content second in order to be a piece of first candidate master content.

Next, the no-match determining unit 41 determines regions where feature values do not match in corresponding regions of corresponding sections between the piece of first candidate master content and the piece of master content third in order. The matching feature count calculating unit 42 then calculates, on the basis of whether or not the feature values of the regions in the piece of first candidate master content match the feature values of the corresponding query content, the matching feature count of the piece of first candidate master content. Also, the matching feature count calculating unit 42 calculates, on the basis of whether or not the feature values of the regions in the piece of master content third in order match the feature values of the corresponding query content, the matching feature count of the piece of master content first in order. The determining unit 43 then determines the content of which the matching feature count is larger, out of the piece of first candidate master content and the piece of master content third in order, as a piece of second candidate master content which is a new piece of candidate master content. Further, the no-match determining unit 41, the matching feature count calculating unit 42, and the determining unit 43 repeat the above-described processing, and the identifier of the piece of candidate master content at the point in time that processing taking all pieces of master content as the object thereof has ended, is determined to be the identifier of the query content.

That is to say, the content determining unit 4 determines regions where feature values do not match in corresponding regions of corresponding sections between the piece of master content first in order and the piece of master content second in order. The content determining unit 4 then calculates the matching feature count for each of the piece of master content first in order and the piece of master content second in order, on the basis of these regions. The content determining unit 4 then determines the piece of master content of which this matching feature count is larger to be a piece of first candidate master content. Next, the content determining unit 4 determines regions where feature values do not match in corresponding regions of corresponding sections between a piece of k'th candidate master content and piece of master content (k+2)'th in order, in order from k=1 through (N–2). The content determining unit 4 then calculates the matching feature count of each of the piece of k'th candidate master content and the piece of master content (k+2)'th in order. The content determining unit 4 then determines the content of which the matching feature count is larger to be a piece of (k+1)'th candidate master content which is a new piece of candidate master content. The content determining unit 4 determines the identifier of the piece of (k+1)'th candidate master content determined when k=N–2, i.e., of the piece of (N–1)'th candidate master content, to be the identifier of the query content.

In still other words, the content determining unit 4 determines regions where feature values do not match in corresponding regions of corresponding sections between a piece of master content highest in order and a piece of master content next highest in order, and determines the piece of master content of which the matching feature count is larger, on the basis of these regions, to be a piece of candidate master content. Further, the content determining unit 4 determines regions where feature values do not match in corresponding regions of corresponding sections with regard to the following content, and determines a piece of master content of which the matching feature count is high to be a new piece of master content, on the basis of feature values in these regions. The piece of candidate master content, and the piece of master content that has the highest order out of pieces of master content regarding which determination has not been made for regions where feature values do not match each other. The content determining unit 4 repeats this, and the determines the identifier of the candidate master content determined at the last to be the identifier of the query content.

The output unit 5 outputs the identifier of the query content that has been determined by the content determining unit 4 to another device via a communication network.

Figure 6:
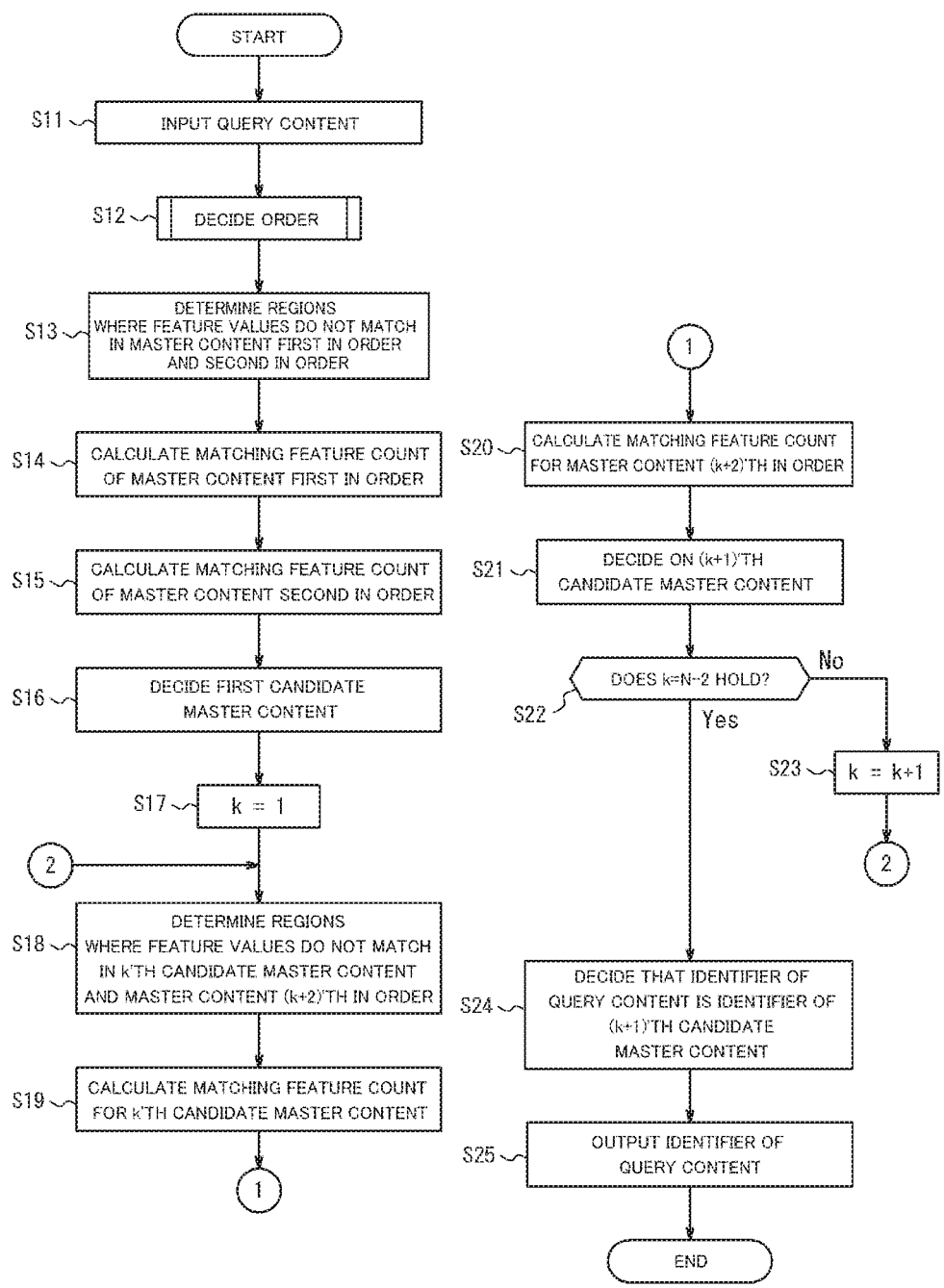
FIG. 6 is a flowchart illustrating an example of a content determining method according to the first embodiment of the present invention.

Next, the content determining method by the content determining device 100 according to the first embodiment will be describe with reference to FIG. 6. FIG. 6 is a flowchart illustrating an example of the content determining method.

First, a piece of query content provided by a television broadcast or the like is input by the input unit 2 (step S11).

Next, the order of the N types of master content is decided by the master order deciding unit 3 such that the smaller the comprehensive similarity value as to the query content is, the higher the order is (step S12).

Figure 7:
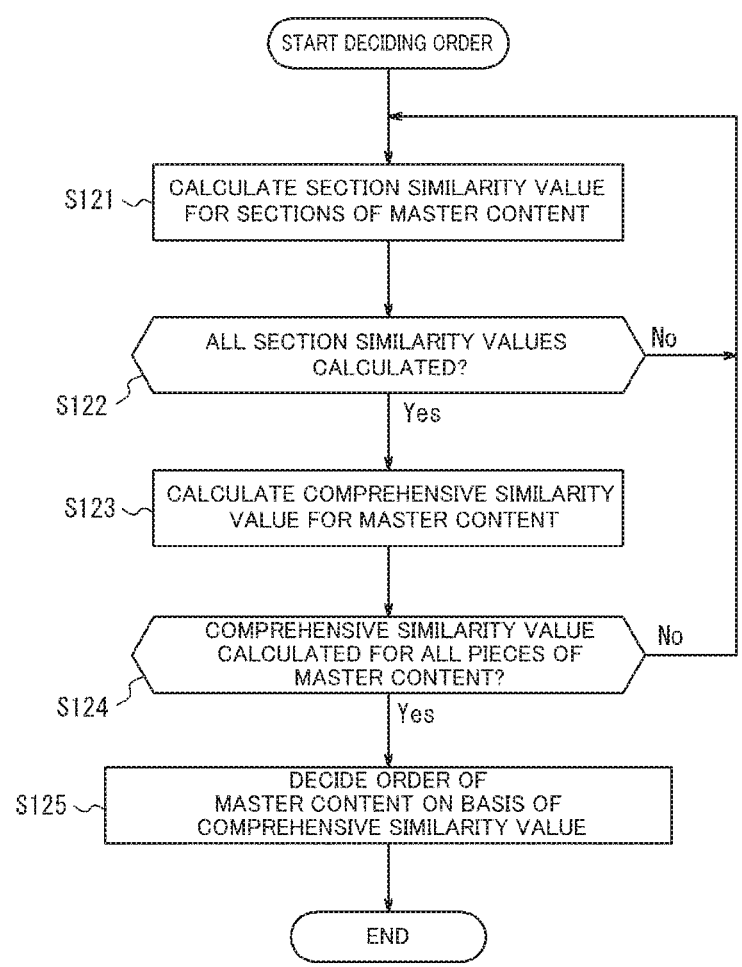
FIG. 7 is a flowchart illustrating details of processing for deciding an order of master content.

Description regarding details of deciding the order by the master order deciding unit 3 will be made with reference to FIG. 7.

First, the master order deciding unit 3 calculates section similarity values of the sections in a piece of master content as to the corresponding sections in the query content (step S121).

Next, the master order deciding unit 3 determines whether or not a section similarity value has been calculated for all sections (step S122).

In a case of determining that a section similarity value has not been calculated for all sections in step S122, the master order deciding unit 3 returns to step S121 and calculates section similarity values for the remaining sections. In a case of determining that a section similarity value has been calculated for all sections in step S122, the master order deciding unit 3 calculates the smallest value of the section similarity values of the piece of master content as being a comprehensive similarity value (step S123).

Next, the master order deciding unit 3 determines whether or not a comprehensive similarity value has been calculated for all pieces of master content (step S124).

In a case of determining that a comprehensive similarity value has not been calculated for all pieces of master content in step S124, the flow returns to step S121 and the comprehensive similarity value is calculated for the remaining pieces of master content. In a case of determining that a comprehensive similarity value has been calculated for all pieces of master content in step S124, the master order deciding unit decides the order of the pieces of master content such that the smaller of the comprehensive similarity value is out of the N types of master content, the higher the order is (step S125).

Returning to reference FIG. 6, the no-match determining unit 41 determines regions where feature values do not match in corresponding regions of corresponding sections between the piece of master content first in order and the piece of master content second in order (step S13).

Next, the matching feature count calculating unit 42 calculates the matching feature count of the piece of master content first in order, on the basis of the feature values of the regions determined in step S13 (step S14).

Next, the matching feature count calculating unit 42 calculates the matching feature count of the piece of master content second in order, on the basis of the feature values of the regions determined in step S13 (step S15). Note that the matching feature count calculating unit 42 may perform the processing of step S14 after the processing of step S15.

Next, the piece of master content of which the matching feature count calculated in step S14 and step S15 is larger is determined to be the piece of first candidate master content (step S16).

Next, the no-match determining unit 41 sets k=1 (step S17).

Next, the no-match determining unit 41 determines regions where feature values do not match in corresponding regions of corresponding sections between the piece of k'th candidate master content and the piece of master content (k+2)'th in order (step S18).

Next, the matching feature count calculating unit 42 calculates the matching feature count of the piece of k'th candidate master content, on the basis of feature values of regions determined in step S18 (step S19).

Next, the matching feature count calculating unit 42 calculates the matching feature count of the piece of master content (k+2)'th in order, on the basis of feature values of regions determined in step S18 (step S20). Note that the matching feature count calculating unit 42 may perform the processing of step S19 after the processing of step S20.

Next, the determining unit 43 determines the piece of master content of which the matching feature count calculated in step S19 and step S20 is larger to be the piece of (k+1)'th candidate master content (step S21).

Next, the determining unit 43 determines whether k=(N−2) holds or not (step S22).

In a case of determining that k=(N−2) does not hold in step 322, the determining unit 43 sets k=k+1 (step S23), the flow returns to step S18, and the no-match determining unit 41 and the matching feature count calculating unit 42 repeat the processing up to step S21.

In a case of determining that k=(N−2) holds in step S22, the determining unit 43 determines that the identifier of the piece of master content that is the (k+1)'th candidate master content is the identifier of the query content (step S24).

Next, the output unit 5 outputs the identifier of the query content that has been determined in step S24 to another device (step S25).

Note that a computer can be suitably used to function as the above-described content determining device 100, and that such a computer can be realized by storing a program, in which is described processing content that realizes the functions of the content determining device 100, in a database of the computer, and a CPU of the computer reading out and executing this program.

The program may also be recorded in a computer-readable medium. Using a computer-readable medium enables installation in a computer. The computer-readable medium in which the program is recorded here may be a non-transitory recording medium. The non-transitory recording medium is not restricted in particular, and may be a recording medium such as a CD-ROM or DVD-ROM, for example.

As described above, according to the first embodiment, the content determining device 100 determines regions where feature values do not match in corresponding regions of corresponding sections of two pieces of master content out of a plurality of pieces of master content, calculates a matching feature count for each of the two pieces of master content, and determines the identifier of query content on the basis of these matching feature counts. Accordingly, the content determining device 100 can accurately determine the identifier of the query content even in a case where noise is contained in one or more of the plurality of pieces of master content and the query content.

In a case where matching feature counts happen to be determined on the basis of feature values where one of three or more pieces of master content do not match, determination will be made that feature values do not match in a greater number of regions as compared to determination in two pieces of master content. In this case, calculating matching feature counts on the basis of each of the feature values of these great number of regions results in the proportion of the matching feature count owing to feature values in unique portions being lower. In accordance with this, the proportion of the matching feature count owing to noise included in feature values in other than unique portions becomes relatively high, and trouble can occur where the identifier of the query content cannot be accurately determined. However, in the content determining device 100 according to the first embodiment, regions where feature values do not match in corresponding regions of corresponding sections of two pieces of master content are determined, and accordingly the proportion of the matching feature count owing to feature values in unique portions is high, and master content can be accurately determined.

In a case where matching feature counts happen to be determined on the basis of feature values where none of three or more pieces of master content match, if there are two or more regions containing unique portions in at least two or more pieces of N types of master content, determination may be made that the feature values match in the regions containing unique portions. Accordingly, trouble may occur in which matching feature counts for the unique portion characterizing the pieces of master content are not calculated, and the identifier of the query content cannot be accurately determined. However, the content determining device 100 according to the first embodiment performs determining using two pieces of master content, and accordingly the problem where pieces of master content are not accurately determined, due to regions where feature values do not match not being suitably determined, can be avoided.

Note that in verification experimentation performed by the present inventors, in a case where the storage unit 1 stored 5,719 types of master content, the content determining device 100 determined identifiers of content having a total of 480 hours of playback time. As a result, recall rate was 98.6% and precision was 98.7%. Conversely, in a case where the identifier of the piece of master content that has the the largest comprehensive similarity value, which is the smallest value of section similarity values, is determined to be the identifier of the query content, as in conventional arrangements, recall rate was 98.1% and precision was 98.3%. That is to say, it was verified that the content determining device 100 according to the first embodiment determines the identifier of the query content more accurately as compared to conventional arrangements.

Also, according to the first embodiment, the content determining device 100 decides the order of each of the pieces of master content on the basis of the comprehensive similarity value of each of the plurality of pieces of master content, and determines pieces of candidate content in accordance with this order. Accordingly, the larger the comprehensive similarity value of piece of master content is, the fewer number of times it will be the object of this determination, so the higher the probability of being finally taken as a piece of candidate master content will be. Thus, the content determining device 100 determines the identifier on the basis of not only matching feature count but also the order decided by the comprehensive similarity value. Accordingly, the content determining device 100 can determine the identifier even more accurately.

Also, according to the first embodiment, the content determining device 100 determines regions where feature values do not match in corresponding regions of corresponding sections regarding the following content. The piece of candidate master content, and the piece of master content that has the highest order out of pieces of master content regarding which determination has not been made for regions where feature values do not match. The content determining device 100 then repeats calculation of the matching feature count for each, and determining the one of which this matching feature count is larger to be a new piece of candidate master content. Accordingly, the content determining device 100 does not need to determine regions where feature values do not match in corresponding regions of corresponding sections of all combinations of two pieces of master content. That is to say, the content determining device 100 does not need to perform determination regarding $_NC_2$ combinations of two pieces of master content, which is the number of all combinations, and it is sufficient to perform determination regarding (N−1) combinations of two pieces of master content. Also, the content determining device 100 does not need to calculate matching feature counts for $_NC_2$ combinations of two pieces of master content, and it is sufficient to calculate matching feature counts regarding (N−1) combinations of two pieces of master content. Accordingly, the content determining device 100 can determine the identifier of the query content with a smaller processing load.

Also, in the first embodiment, the content determining unit 4 calculates the matching feature count for each of two pieces of master content, regarding regions based on the following determination, but this is not restrictive. The above-mentioned determining is determining regions where feature values do not match in corresponding regions of corresponding sections of these two pieces of master content, in a sequence based on the order decided by the master order deciding unit 3. For example, the content determining unit 4 may determine regions where feature values do not match in corresponding regions of corresponding sections of the two pieces of master content in an optional sequence, and calculate the matching feature count for each of the two pieces of master content.

Also, in the first embodiment, the content determining unit 4 determines, regarding all of N types of master content, regions where feature values do not match in corresponding regions of corresponding sections as to another piece of master content, and calculates the matching feature count for each of the two pieces of master content, but this is not restrictive. For example, the content determining unit 4 may determine regions where feature values do not match in corresponding regions of corresponding sections regarding two pieces of master content of which the comprehensive similarity values decided by the master order deciding unit 3 are largest, i.e., regarding a piece of master content N'th in order and a piece of master content (N−1)'th in order, and determine that the identifier of the piece of master content of which the matching feature count calculated on the basis of these regions is larger to be the identifier of the query content.

Second Embodiment

Next, a second embodiment of the present invention will be described with reference to the Figures.

Figure 8:
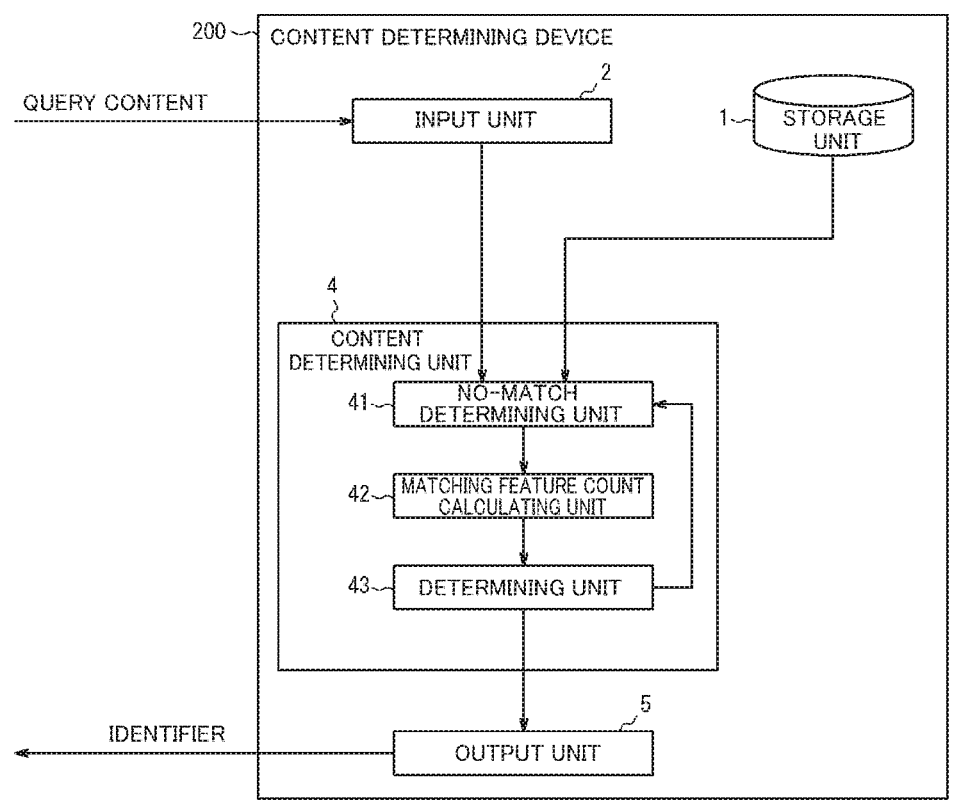
FIG. 8 is a block diagram illustrating a configuration example of a content determining device according to a second embodiment of the present invention.

FIG. 8 is a diagram illustrating a configuration example of a content determining device 200 according to the second embodiment. The content determining device 200 is provided with the storage unit 1, input unit 2, content determining unit 4, and output unit 5, as illustrated in FIG. 8. The content determining device 200 is not provided with the master order deciding unit 3, and in this point differs from the content determining device 100 according to the first embodiment. Note that configuration blocks which are the same as with the first embodiment are denoted with the same reference symbols, and description will be omitted as appropriate.

In the second embodiment, the no-match determining unit 41 determines regions where feature values do not match in corresponding regions of corresponding sections, regarding one piece of master content and another piece of master content, for all combinations of two pieces of master content extracted from N types of master content. The matching feature count calculating unit 42 calculates the matching feature count for the two piece of master content, regarding each of all combinations of two pieces of master content.

Accordingly, the no-match determining unit 41 and matching feature count calculating unit 42 perform $_NC_2$ combinations of determination. For example, in a case where four types of master content are stored in the storage unit 1, the no-match determining unit 41 determines a region $A_{12}$ where feature values do not match each other between a piece of master content 1 and a piece of master content 2. The matching feature count calculating unit 42 then calculates the matching feature count of the master content 1 on the basis of the feature value of the region $A_{12}$ of the master content. 1 and the feature value of a region corresponding to the region $A_{12}$ in the query content. Further, the matching feature count calculating unit 42 calculates the matching feature count of the master content 2 on the basis of the feature value of the region $A_{12}$ of the master content 2 and the feature value of a region corresponding to $A_{12}$ in the query content.

In the same way, the no-match determining unit 41 and matching feature count calculating unit 42 determine a region $A_{13}$ where feature values do not match each other in a combination between the master content 1 and a piece of master content 3, and calculate the matching feature count for each of the master content 1 and master content 3 on the basis of the region $A_{13}$. Further, the no-match determining unit 41 and matching feature count calculating unit 42 each perform the same processing on a combination of the master content 1 and a piece of master content 4, a combination of the master content 2 and the master content 3, a combination of the master content 2 and the master content 4, and a combination of the master content 3 and the master content 4.

The determining unit 43 determines that the identifier of a piece of master content where the matching feature count calculated by the matching feature count calculating unit 42 is the largest, is the identifier of the query content.

Figure 9:
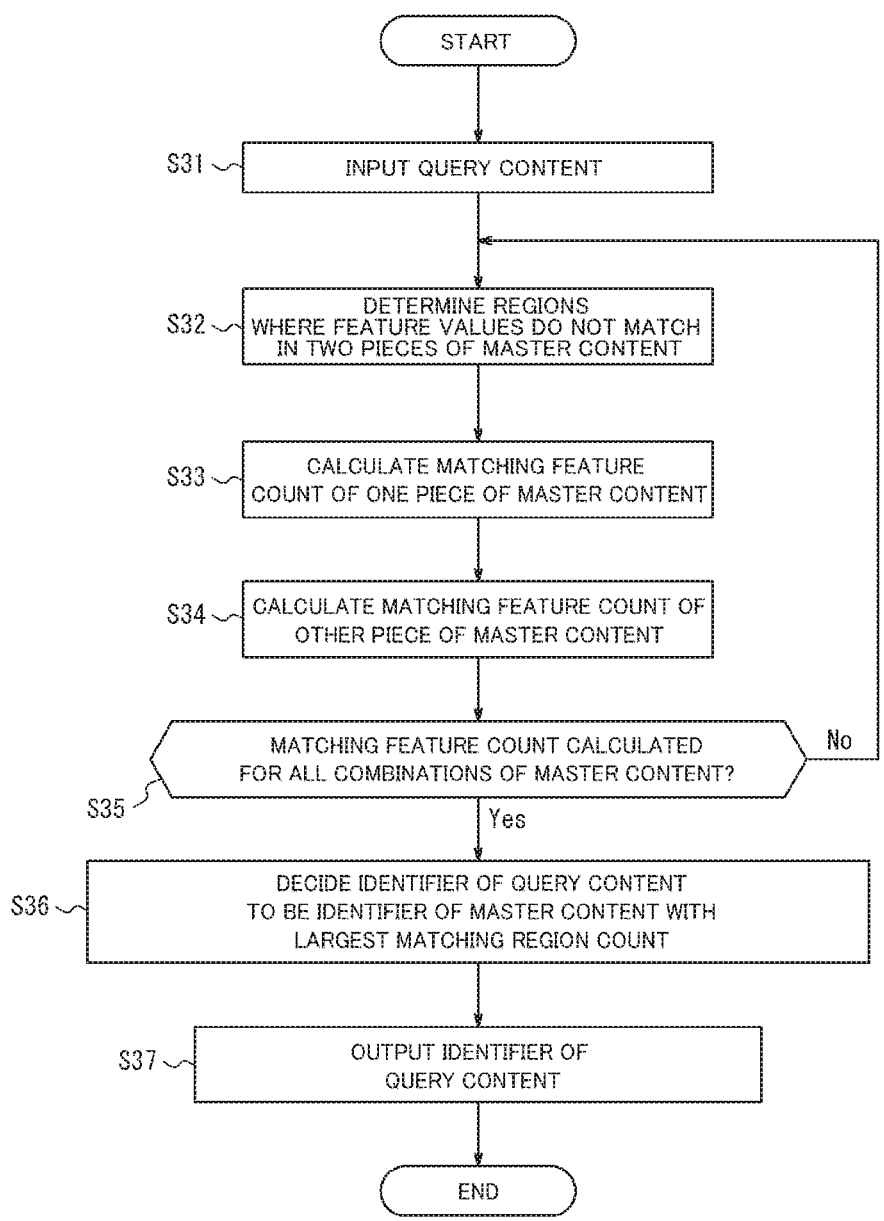
FIG. 9 is a flowchart illustrating an example of a content determining method according to the second embodiment of the present invention.

Next, a content determining method by the content determining device 200 according to the second embodiment will be described with reference to FIG. 9. FIG. 9 is a flowchart illustrating an example of the content determining method.

First, the input unit 2 inputs query content provided by a television broadcast or the like (step S31).

Next, the no-match determining unit 41 determines regions where feature values do not match each other in two pieces of master content (step S32).

Next, the matching feature count calculating unit 42 calculates the matching feature count for one of the pieces of master content (step S33).

Next, the matching feature count calculating unit 42 calculates the matching feature count for the other of the pieces of master content (step S34).

Next, the matching feature count calculating unit 42 determines whether or not matching feature counts have been calculated for all combinations of master content (step S35).

In a case where determination is made in step S35 that matching feature counts have not been calculated for all combinations of master content, the flow returns to step S32. And the no-match determining unit 41 and matching feature count calculating unit 42 repeat the processing up to step S34.

In a case where determination is made in step S35 that matching feature counts have been calculated for all combinations of master content, the determining unit 43 determines that the identifier of the master content of which the matching feature count is the largest is the identifier of the query content (step S36).

Next, the output unit 5 outputs the identifier determined in step S36 to another device (step S37). The output unit 5 may output the master content determined in step S36 to another device.

Note that a computer can be suitably used to function as the above-described content determining device 200, and that such a computer can be realized by storing a program, in which is described processing content that realizes the functions of the content determining device 200, in a database of the computer, and a CPU of the computer reading out and executing this program.

The program may also be recorded in a computer-readable medium. Using a computer-readable medium enables installation in a computer. The computer-readable medium in which the program. is recorded here may be a non-transitory recording medium. The non-transitory recording medium is not restricted in particular, and may be a recording mediumsuch as a CD-ROM or DVD-ROM, for example.

As described above, accord ng to the second embodiment, the content determining device 200 determines regions where feature values do not match each other between two pieces of master content out of N types of master content, and calculates the matching feature count for each of these two pieces of master content. The content deter fining device 200 then deter es the identifier of the query content on the basis of the matching feature count for each piece of master content calculated by all combinations of the N types of master content. Accordingly, the content determining device 200 can determine the identifier of the query content more accurately than the content determining device 100 according to the first embodiment.

Third Embodiment

Next, a third embodiment of the present invention will be described with reference to the Figures.

Figure 10:
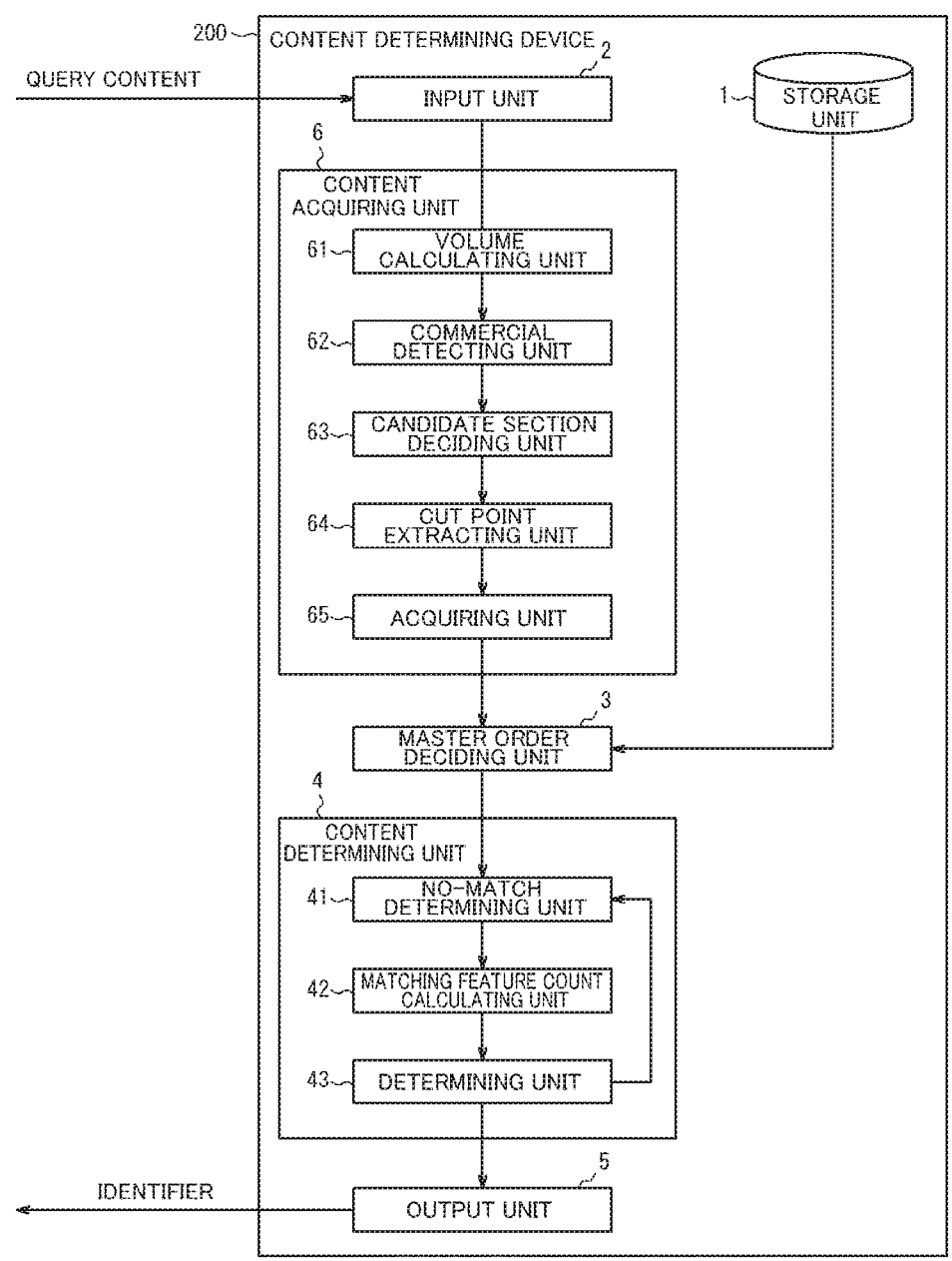
FIG. 10 is a block diagram illustrating a configuration example of a content determining device according to a third embodiment of the present invention.

FIG. 10 is a diagram illustrating a configuration example of a content determining device 300 according to the third embodiment. The content determining device 300 is provided with the storage unit 1, input unit 2, content determining unit 4, and output unit 5, as illustrated in FIG. 10. The content determining device 200 is further provided with a content acquiring unit 6, and in this point differs from the content determining device 100 according to the first embodiment. Note that configuration blocks which are the same as with the first embodiment are denoted with the same reference symbols, and description will be omitted as appropriate.

In the third embodiment, the input unit 2 obtains optional content. The content input, by the input unit 2 may be content consecutively containing a plurality of commercials and programs, received by television broadcast.

The content acquiring unit 6 acquires query content from the content input by the input unit 2. For example, the input unit 2 acquires content of a portion of a commercial from the content consecutively containing a plurality of commercials and programs, as query content. The content acquiring unit 6 is provided with a volume calculating unit 61, a commercial detecting unit 62, a candidate section deciding unit 63, a cut point extracting unit 64, and an acquiring unit 65.

Figure 11:
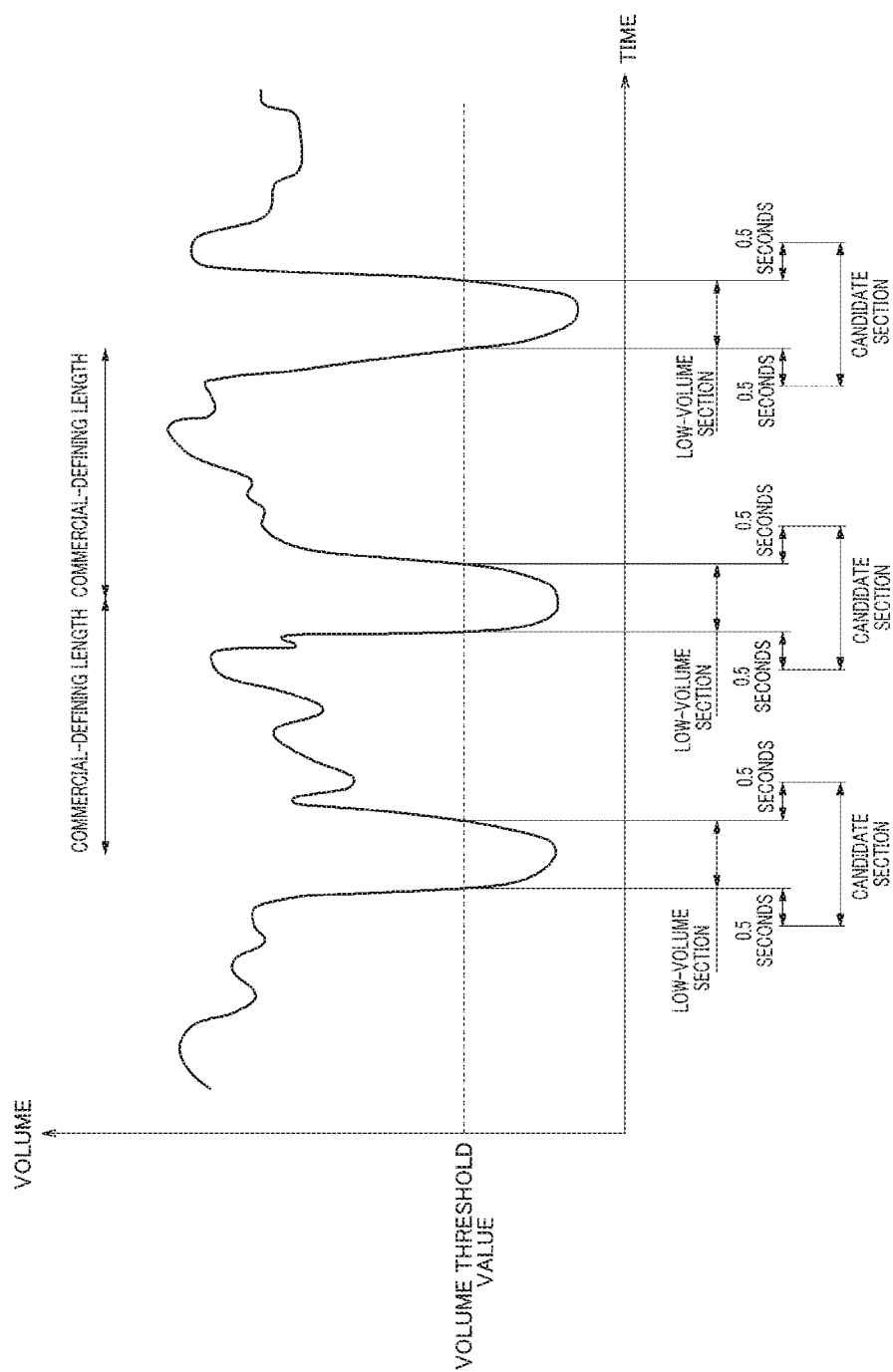
FIG. 11 is a diagram illustrating time-series data of volume in content.

The volume calculating unit 61 calculates volume in time series of content input by the input unit 11, as illustrated in FIG. 11.

The commercial detecting unit 62 determines a period of time during which the volume is smaller than a volume threshold value for a predetermined amount of time (e.g., 0.1 seconds) or more (hereinafter referred to as "low-volume section") from the time-series data of volume calculated by the volume calculating unit 61. The commercial detecting unit 62 then detects a portion where an interval of a low-volume section is a commercial-defining length, to be a commercial. The commercial-defining length is time of playing one commercial, and is, for example, 15 seconds, 30 seconds, 45 seconds, or the like.

The candidate section deciding unit 63 decides a period of time including a low-volume section at both ends of a commercial detected by the commercial detecting unit 62 as being a candidate section. For example, the candidate section deciding unit 63 decides a period of time that follows a point in time preceding the start point of time of the low-volume section by a predetermined amount of time (e.g., 0.5 seconds) up to a point in time trailing the end point of time of the low-volume section by a predetermined amount of time (e.g., 0.5 seconds) to be a candidate section. Note that the commercial detecting unit 62 detects a portion where the interval of low-volume sections is a commercial-defining length as a commercial, as described above. Accordingly, out of the low-volume sections, the only low-volume sections included in a candidate section are low-volume sections where a given point in time of a low-volume section is a predetermined time interval away.

The cut point extracting unit 64 extracts C_k (an integer of 0 or larger) cut points from each of a plurality of candidate sections Tk (k=1 through n (n is an integer of 2 or larger) decided by the candidate section deciding unit 63. A cut point is a playback point in time of a frame of which an amount of change is a pixel change threshold value or larger, out of a plurality of frames making up video of a candidate section. The amount of change is a value based on difference or ratio between pixel values of each frame and pixel values of the preceding frame of that frame. For example, the amount of change may be a value based on the difference between pixel values of each pixel making of each frame, and pixel values of pixels of the preceding frame corresponding to each of the pixels in each frame. A value based on difference is, for example, the sum of absolute values of difference regarding each pixel, average value, or alternatively median value, or mean-square value of difference. The amount of change may also be the ratio between average values of pixels between one frame and the preceding frame of this frame. The playback point in time is, with a start point in a case where content is to be played from the beginning as a reference point in time, a time elapsed from the reference point in time. The cut point extracting unit 64 extracts the playback point in time of a frame of which the amount of change is the pixel change threshold value or larger, as a cut point. For example, the cut point extracting unit 64 may take a playback point in time of a frame of which the ratio and difference in amount of change are each the pixel change threshold value or larger to be a cut point. Note that in experimentation, six to eight cut points are often detected from each candidate section Tk.

Figure 12:
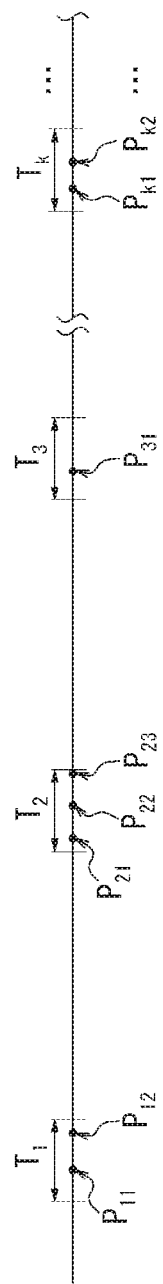
FIG. 12 is a diagram for describing candidate sections and cut points.

In the example illustrated in FIG. 12, the cut point extracting unit 64 extracts a C_1 count (count of two in FIG. 12) of cut points from candidate section T1, extracts a C_2 count (count of three in FIG. 12) of cut points from candidate section T2, and extracts a C_3 count (count of one in FIG. 12) of cut points from candidate section T3. In the same way, the cut point extracting unit 64 extracts a C_k count of cut points from candidate section Tk (where k is a natural number).

The acquiring unit 65 determines commercial boundaries on the basis of cut points, and acquires a commercial between adjacent commercial boundaries as query content. Commercial boundaries are points in time that service as sectioning between two consecutive commercials in a piece of content, and points in time that serve as sectioning between programs and commercials.

Specifically, the acquiring unit 65 selects one cut point from each of a plurality of candidate sections each containing one or more cut points. The acquiring unit 65 determines commercial boundaries on the basis of the cut points contained in each cut point series Sj. A cut point series Sj is a combination of cut points selected from each of a plurality of candidate selcetions, and a total count Call of the cut point series Sj is as shown in Formula (1). Note that in a case where no cut points are detected in the candidate section Tk, C_k=1 is set.

$$\text{Call} = C\_1 \times C\_2 \times \ldots C\_k \times \ldots \times C\_n \quad (1)$$

Specifically, the acquiring unit 65 determines commercial boundaries on the basis of adjacent cut point time of cut points contained in each cut point series Sj and commercial-defining length. Adjacent cut point time is time between a cut point in each candidate section and a cut point in a preceding candidate section.

More specifically, the acquiring unit 65 calculates the difference between each adjacent cut point time and the commercial-defining length. The acquiring unit 65 calculates a count where this difference is smaller than a time difference threshold value (hereinafter referred to as "count of agreement"), for each cut point series Sj, taking the effects of noise into consideration. The time difference threshold value is time during which a predetermined frame count of video of the content is played, for example. The predetermined frame count is two frames, for example. In a case where the framerate of the video of the content is 30 fps, the time over which two frames are played, i.e., the time difference threshold value, is (2/30) seconds.

Figure 13:
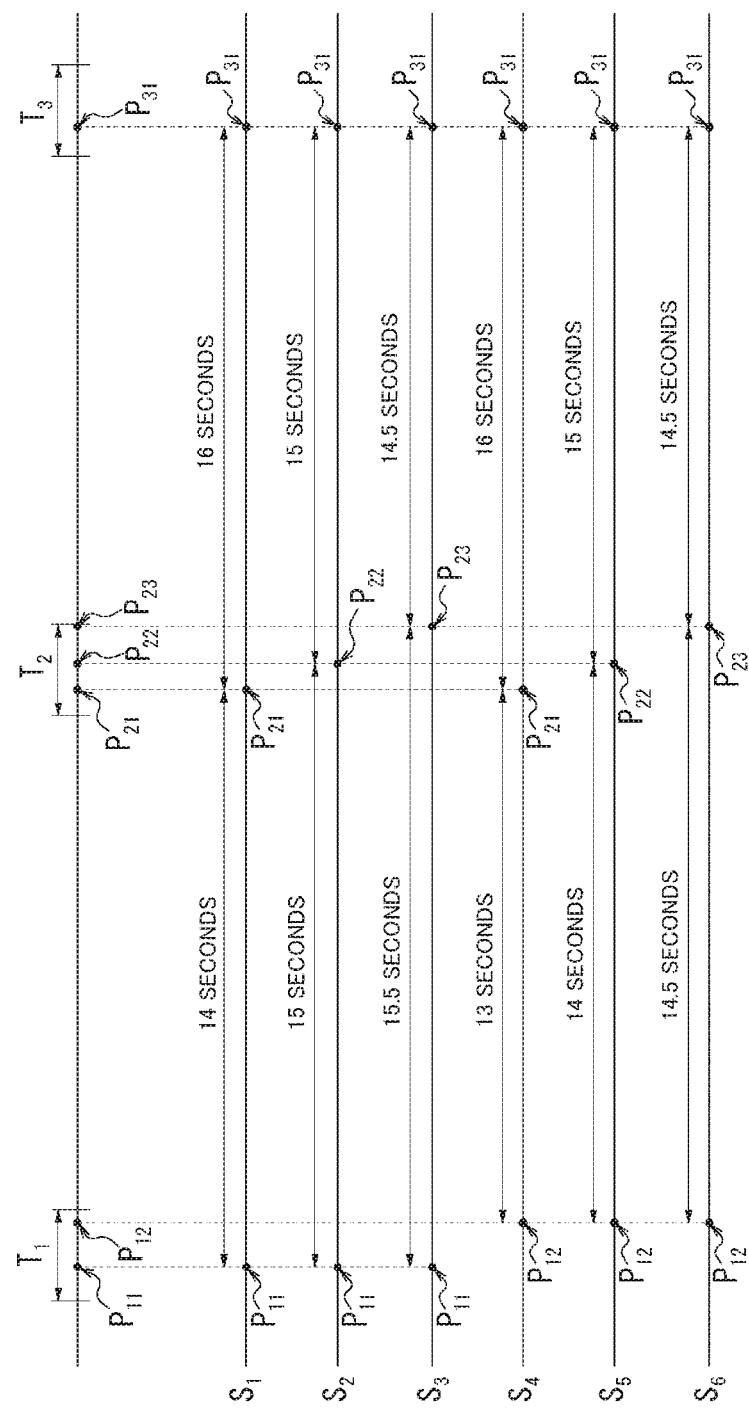
FIG. 13 is a diagram for describing an example of a determining unit determining a boundary series.

As one example, a case where the candidate section deciding unit 63 decides three candidate sections T1 through T3, and the cut point extracting unit 64 extracts two cut points P11 and P12 from, candidate section T1, three cut points P21, P22, and P23 from candidate section T2, and one cut point P31 from candidate section T3, as illustrated in FIG. 13, will be described.

In the example illustrated in FIG. 13, the total count Call of the cut point ser es Sj is a count of C_1×C_2×C_3=2×3×1=6. A cut point series S1 is a series made up of the combination of cut point P11, cut point P21, and cut point P31. A cut point series S2 is a series made up of the combination of cut point P11, cut point P22, and cut point P31. A cut point series S4 is a series made up of the combination of cut point P11, cut point P23, and cut point P31. A cut point series S4 is a series made up of the combination of cut point P12, cut point P21, and cut point P31. A cut point series S5 is a series made up of the combination of cut point P12, cut point P22, and cut point P31. A cut point series S6 is a series made up of the combination of cut point P12, cut point P23, and cut point P31.

The acquiring unit 65 calculates the difference between each adjacent cut point time in each cut point series S1 (j=1 through 6), and the commercial-defining length. With the commercial-defining length as 15 seconds and the predetermined range as (2/30) seconds, the acquiring unit 65 calculates the counts of agreement of the cut point series S1 through S6 as being 0, 2, 0, 0, 1, and 0, respectively.

The acquiring unit 65 determines whether or not there are a plurality of cut point series Sj where the count of agreement is greatest. In a case where the count of cut point series Sj where the count of agreement is greatest is one, the acquiring unit 65 determines the cut point series Sj to be a boundary series. In the example illustrated in FIG. 13, the acquiring unit 65 determines the cut point series S2 to be a boundary series, since out of the cut point series S1 through S6, the cut point series where the count of agreement is largest, is one, the cut point series S2.

In a case of having determined that the count of cut point series Sj where the count of agreement is greatest is a plurality, the acquiring unit 65 determines that out of the plurality of cut point series Sj where the count of agreement is greatest, the cut point series Sj having the smallest sum of differences between each adjacent cut point time and the commercial-defining length is to be the boundary series.

The acquiring unit 65 then determines the commercial boundary on the basis of the boundary series. Specifically, the acquiring unit 65 determines that a cut point in the boundary series where the adjacent cut point time agrees with the commercial-defining length is the commercial boundary.

Also, in the boundary series, the acquiring unit 65 determines the commercial boundary of a candidate section in the following case, on the basis of a commercial boundary decided in an adjacent candidate section and the commercial-defining length. A case where the adjacent cut point time does not include a cut point that agrees with the commercial-definjng length.

Figure 14:
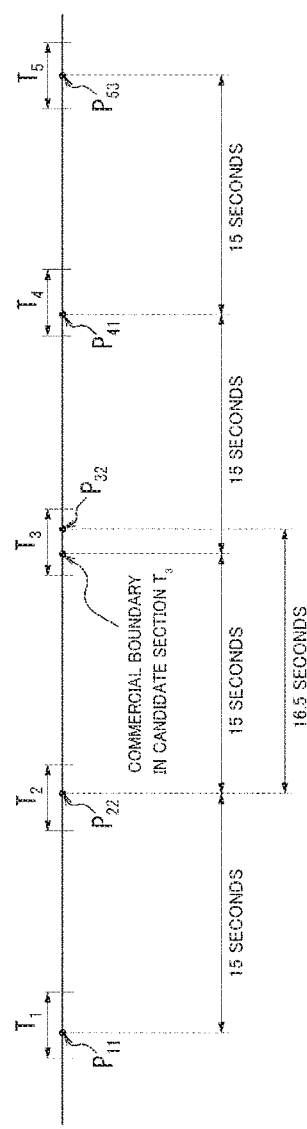
FIG. 14 is a diagram for describing an example of the determining unit determining a commercial boundary.

In one example, in a case where there is a cut point in the boundary series where the difference between the adjacent cut point time and commercial-defining length is the time different threshold value or larger, the acquiring unit 65 determines a point in time where the commercial-defining length has elapsed from the commercial boundary determined as described above, to be the commercial boundary. In the example illustrated in FIG. 14, assuming that the boundary series has been determined to be a cut point series made up of cut points P11, P22, P32, P41, and P53, unlike the example illustrated in FIG. 13. Also, in this boundary series, assuming that the acquiring unit 65 has determined that the adjacent cut point time regarding cut point P22 agrees with 15 seconds, which is the commercial-defining length. Also, assuming that the adjacent cut point time regarding the cut point P32 is 16.5 seconds, and accordingly the acquiring unit 65 has determined that the difference between the adjacent cut point time and the commercial-defining length is no less than the time difference threshold value. In this case, the acquiring unit 65 determines the cut point P22 to be the commercial boundary in the candidate section T2. The acquiring unit 65 then determines that a time point from the cut point P22, to which has been added time obtained by adding/subtracting a tolerance time to/from the commercial-defining length, is the commercial boundary in the candidate section T3, instead of the cut, point P32. Tolerance time is time that differs for each candidate section. The tolerance time for each candidate section is adjusted so that the total of time obtained by adding/subtracting the tolerance time to/from the commercial-defining length is the playing time of the entire commercial.

Figure 15A:
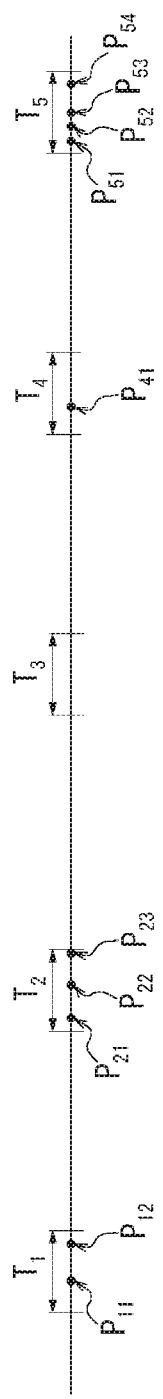
FIG. 15A is a diagram for describing a candidate section where no cut point was extracted.
Figure 15B:
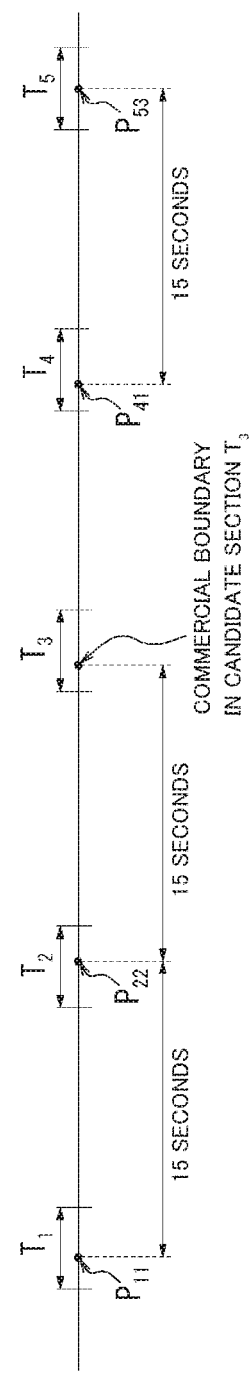
FIG. 15B is a diagram for describing an example of determining a commercial boundary in a candidate section where no cut point was extracted.

In another example, in a case where no cut point, has been extracted from the candidate section Tk by the cut point extracting unit 64, the acquiring unit 65 determines a time point where the time from the commercial boundary determined as described above is the commercial-defining length as being a commercial boundary. In the example illustrated in FIG. 15A, the cut point extracting unit 64 has not yet extracted cut points in the candidate section T3. Also, the acquiring unit 65 has determined that the boundary series is the cut point series made up of cut points P11, P22, P41, and P53. In this case, the acquiring unit 65 determines that a point in time from the commercial boundary extracted in the candidate section T2 preceding the candidate section T3 to which has been added time obtained by adding/subtracting a tolerance time to/from the commercial-defining length is the commercial boundary in the candidate section T3, as illustrated in FIG. 15B.

Upon the commercial boundary having been determined in this way, the acquiring unit 65 acquires content between adjacent commercial boundaries as query content.

The master order deciding unit 3 uses the query content acquired by the acquiring unit 6 to decide the order of the pieces of master content, in the same way as in the first embodiment.

Next, a content determining method by the content determining device 300 according to the third embodiment will be described.

In the content determining method according to the third embodiment, upon query content being input in step S11 in the content determining method according to the first embodiment, the content acquiring unit 6 acquires query content from content input by the input unit 2. Upon query content having been acquired, the processing of step S11 through step S21 is executed using the acquired query content.

Figure 16:
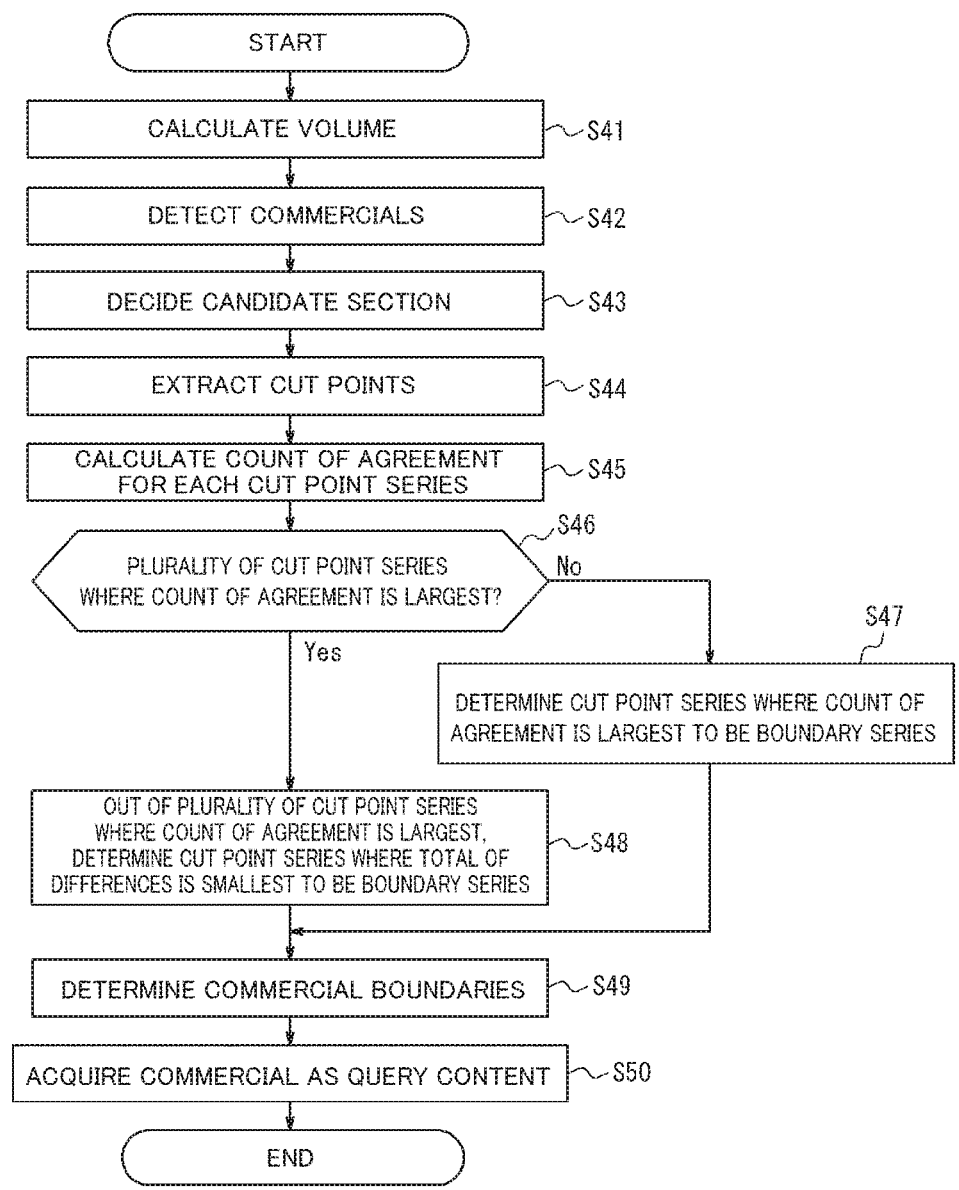
FIG. 16 is a flowchart illustrating an example of a method of a content acquisition unit executes in a commercial boundary determining method according to the third embodiment of the present invention.

Now, a query content acquiring method by the content acquiring unit 6 will be described in detail with reference to FIG. 16. FIG. 16 is a flowchart illustrating an example of the query content acquiring method.

The volume calculating unit 61 calculates volume in a time series of content input by the input unit 2 (step S41).

Next, the commercial detecting unit 62 extracts low-volume sections where the volume calculated in step S41 is smaller than the volume threshold value. Portions where intervals between mutually adjacent low-volume sections are the commercial-defining length are detected as commercials (step S42).

Next, the candidate section deciding unit 63 decides a period of time that follows a point in time preceding the start point of time of the low-volume section by a predetermined amount of time (e.g., 0.5 seconds) up to a point in time trailing the end point of time of the low-volume section by a predetermined amount of time (e.g., 0.5 seconds) to be a candidate section (step S43).

Next, the cut point extracting unit 64 extracts cut points from video in the candidate sections decided in step S43 (step S44).

Next, the determining unit 65 calculates a count of agreement regarding all cut point, series $S_j$ made up of a combination of cut points within the candidate sections extracted in step S44 (step S45).

Next, the determining unit 65 determines whether or not there are a plurality of cut point series $S_j$ where the count of agreement is greatest (step S46).

In a case of determining that there is one cut point series $S_j$ where the count of agreement is greatest in step S46, the determining unit 65 determines this cut point series $S_j$ to be a boundary series (step S47).

In a case of determining that there is a plurality of cut point series $S_j$ where the count of agreement is greatest in step S46, the determining unit 65 determines that out of the plurality of cut point series $S_j$ where the count of agreement is greatest, the cut point series $S_j$ where the difference between the adjacent cut point time and the commercial-defining length is smallest is the boundary series (step S48).

Upon the boundary series being decided in step S47 or step S48, the acquiring unit 65 determines commercial boundaries on the basis of on the boundary series (step S49).

Next, the acquiring unit 65 acquires a commercial as query content on the basis of the commercial boundaries (step S50).

As described above, according to the third embodiment, the content determining device 300 decides a plurality of candidate sections including low-volume sections where volume in content is smaller than a volume threshold value for a predetermined amount of time or longer, and extracts cut points from candidate sections. The content determining device 300 then determines commercial boundaries on the basis of the cut points. Video is often switched between commercials one another, and between commercials and programs. That is to say, a commercial boundary is often a cut point. Accordingly, the commercial boundary determining unit 1 can accurately detect commercials by determining commercial boundaries on the basis of cut points in candidate sections containing low-volume sections, as compared to a case of determining commercial boundaries on the basis of volume alone. Thus, the content determining device 300 can determine identifiers of query content that is commercials accurately detected.

Note that a computer can be suitably used to function as the above-described content determining device 300, and that such a computer can be realized by storing a program, in which is described processing content that realizes the functions of the content determining device 300, in a database of the computer, and a CPU of the computer reading out and executing this program.

The program may also be recorded in a computer-readable medium. Using a computer-readable medium enables installation in a computer. The computer-readable medium in which the program is recorded may be a non-transitory recording medium. The non-transitory recording medium is not restricted in particular, and may be a recording medium such as a CD-ROM or DVD-ROM, for example.

Although the above embodiments have been described as representative examples, it will be clearly understood to those skilled in the art that many changes and substitutions can be made within the spirit and scope of the present invention. Accordingly, the present invention should not be interpreted as being restricted to the above-described embodiments, and various modifications and changes can be made without departing from the scope of the Claims.

REFERENCE SIGNS LIST 1 storage unit
2 input unit
3 master order deciding unit
4 content determining unit
5 output unit
6 content acquiring unit
41 no-match determining unit
42 similarity calculating unit
43 determining unit
61 volume calculating unit
62 commercial detecting unit.
63 candidate section deciding unit
64 cut point extracting unit
65 acquiring unit
100, 200, 300 content determining device

The invention claimed is:

1. A computer-implemented method for determining content, the method comprising:
receiving a query having query content, the query content comprising one or more sections of data, each of the one or more sections comprising a plurality of regions in temporal series, each of the plurality of regions comprising a plurality of frames in temporal series, the query content having data features values, and each of the data feature values being based on a first frequency spectrum of the data in one of the frames of the query content;
ranking a master content among a plurality of master content based on a similarity value between the master content and the query content, the similarity value being based on a second frequency spectrum of temporally corresponding sections in the master content and the query content;
generating a data feature value of regions of each of the plurality of master content;
using the ranked plurality of master content, iteratively comparing values of a first count of a first master content of the ranked plurality of master content and a second count of a second master content of the ranked plurality of master content, wherein the first count is based at least on a number of regions where a first data feature value of the first master content and a second feature value of the second master content are distinct but the first data feature value matches with the data feature value of the query content;
based on the iterative comparison of the first count and the second count, determining a third master content, the third master content comprising the first count being the highest among the ranked plurality of master content;
determining an identifier of the identified third master content; and
providing the identifier.

2. The computer-implemented method of claim 1,
wherein the first count represents a first number of regions in the first master content where a first data feature value of a first region of a first master content is distinct from a second data feature value of a temporally corresponding second region of a second master content and matches with a third data feature value of a temporally corresponding third region of the query content,
wherein the second count represents a second number of regions in the second master content where the second data feature value is distinct from the first data feature value and matches with the third data feature value, and
wherein the plurality of master content comprises video data.

3. The computer-implemented method of claim 2, wherein the first master content is the highest-ranked master content, and wherein the second master content is the second-highest-ranked master content.

4. The computer-implemented method of claim 2, wherein the similarity value is based on section similarity values, each section similarity value indicating a degree of similarity between sections of the master content and temporally corresponding sections of the query content, and wherein the master content with a smaller the similarity value is ranked higher in the ranked plurality of master content.

5. The computer-implemented method of claim 2, wherein the iterative comparison of values of the first count and the second count is based on a permutation of pairs of master content from the plurality of master content.

6. The computer-implemented method of claim 2, further comprising:
identifying a temporal series of a level of audio volume in the query content, wherein the query content comprises a commercial from a television broadcast;
detecting one or more boundaries based at least on the identified temporal series of the level of audio volume;
determining one or more cut points in the query content based on the one or more boundaries, wherein the one or more cut points comprise frames with pixel changes from previous frames larger than a predetermined threshold, wherein the one or more points represent boundaries of one or more commercials; and determining a candidate section between adjacent boundaries of the query content based on the determined one or more cut points and a predefined commercial-defining length.

7. The computer-implemented method of claim 6, wherein the query content comprises a commercial, and wherein each of the plurality of master content comprises at least a program content of a video broadcast with one or more commercials between the beginning of the program content and the end of the program content, and wherein the identified third master content includes the commercial.

8. A system for determining content, the system comprising:
a processor; and
a memory storing computer executable instructions that when executed by the at least one processor cause the system to:
receive a query having query content, the query content comprising one or more sections of data, each of the one or more sections comprising a plurality of regions in temporal series, each of the plurality of regions comprising a plurality of frames in temporal series, the query content having data features values, and each of the data feature values being based on a first frequency spectrum of the data in one of the frames of the query content;
rank a master content among a plurality of master content based on a similarity value between the master content and the query content, the similarity value being based on a second frequency spectrum of temporally corresponding sections in the master content and the query content;
generate a data feature value of regions of each of the plurality of master content;
using the ranked plurality of master content, iteratively compare values of a first count of a first master content of the ranked plurality of master content and a second count of a second master content of the ranked plurality of master content, wherein the first count is based at least on a number of regions where a first data feature value of the first master content and a second feature value of the second master content are distinct but the first data feature value matches with the data feature value of the query content;
based on the iterative comparison of the first count and the second count, determine a third master content, the third master content comprising the first count being the highest among the ranked plurality of master content;
determine an identifier of the identified third master content; and
provide the identifier.

9. The system of claim 8,
wherein the first count represents a first number of regions in the first master content where a first data feature value of a first region of a first master content is distinct from a second data feature value of a temporally corresponding second region of a second master content and matches with a third data feature value of a temporally corresponding third region of the query content,
wherein the second count represents a second number of regions in the second master content where the second data feature value is distinct from the first data feature value and matches with the third data feature value, and
wherein the plurality of master content comprises video data.

10. The system of claim 9, wherein the first master content is the highest-ranked master content, and wherein the second master content is the second-highest-ranked master content.

11. The system of claim 9, wherein the similarity value is based on section similarity values, each section similarity value indicating a degree of similarity between sections of the master content and temporally corresponding sections of the query content, and wherein the master content with a smaller the similarity value is ranked higher in the ranked plurality of master content.

12. The system of claim 9, wherein the iterative comparison of values of the first count and the second count is based on a permutation of pairs of master content from the plurality of master content.

13. The system of claim 9, the computer-executable instructions when executed further causing the system to:
identify a temporal series of a level of audio volume in the query content, wherein the query content comprises a commercial from a television broadcast;
detect one or more boundaries based at least on the identified temporal series of the level of audio volume;
determine one or more cut points in the query content based on the one or more boundaries, wherein the one or more cut points comprise frames with pixel changes from previous frames larger than a predetermined threshold, wherein the one or more points represent boundaries of one or more commercials; and
determine a candidate section between adjacent boundaries of the query content based on the determined one or more cut points and a predefined commercial-defining length.

14. The system of claim 13, wherein the query content comprises a commercial, and wherein each of the plurality of master content comprises at least a program content of a video broadcast with one or more commercials between the beginning of the program content and the end of the program content, and wherein the identified third master content includes the commercial.

15. A computer-readable non-transitory recording medium storing computer-executable instructions that when executed by a processor cause a computer system to:
receive a query having query content, the query content comprising one or more sections of data, each of the one or more sections comprising a plurality of regions in temporal series, each of the plurality of regions comprising a plurality of frames in temporal series, the query content having data features values, and each of the data feature values being based on a first frequency spectrum of the data in one of the frames of the query content;
rank a master content among a plurality of master content based on a similarity value between the master content and the query content, the similarity value being based on a second frequency spectrum of temporally corresponding sections in the master content and the query content;
generate a data feature value of regions of each of the plurality of master content;
based no the ranked plurality of master content, iteratively compare values of a first count of a first master content of the ranked plurality of master content and a second count of a second master content of the ranked plurality of master content, wherein the first count is based at least on a number of regions where a first data feature value of the first master content and a second feature value of the second master content are distinct but the first data feature value matches with the data feature value of the query content;

based on the iterative comparison of the first count and the second count, identify a third master content, the third master content comprising the first count being the highest among the ranked plurality of master content;

determine an identifier of the identified third master content; and provide the identifier.

16. The computer-readable non-transitory recording medium of claim 15, wherein the first count represents a first number of regions in the first master content where a first data feature value of a first region of a first master content is distinct from a second data feature value of a temporally corresponding second region of a second master content and matches with a third data feature value of a temporally corresponding third region of the query content, wherein the second count represents a second number of regions in the second master content where the second data feature value is distinct from the first data feature value and matches with the third data feature value, and wherein the plurality of master content comprises video data.

17. The computer-readable non-transitory recording medium of claim 16, wherein the similarity value is based on section similarity values, each section similarity value indicating a degree of similarity between sections of the master content and temporally corresponding sections of the query content, and wherein the master content with a smaller the similarity value is ranked higher in the ranked plurality of master content.

18. The computer-readable non-transitory recording medium of claim 16, wherein the iterative comparison of values of the first count and the second count is based on a permutation of pairs of master content from the plurality of master content.

19. The computer-readable non-transitory recording medium of claim 16, the computer-executable instructions when executed further causing the system to:

identify a temporal series of a level of audio volume in the query content, wherein the query content comprises a commercial from a television broadcast;

detect one or more boundaries based at least on the identified temporal series of the level of audio volume;

determine one or more cut points in the query content based on the one or more boundaries, wherein the one or more cut points comprise frames with pixel changes from previous frames larger than a predetermined threshold, wherein the one or more points represent boundaries of one or more commercials; and determine a candidate section between adjacent boundaries of the query content based on the determined one or more cut points and a predefined commercial-defining length.

20. The computer-readable non-transitory recording medium of claim 16, wherein the query content comprises a commercial, and wherein each of the plurality of master content comprises at least a program content of a video broadcast with one or more commercials between the beginning of the program content and the end of the program content, and wherein the identified third master content includes the commercial.

* * * * *